July 21, 1936.　　　　A. S. RIGGS　　　　2,048,082
ELECTRICAL CONTROL SYSTEM
Filed Jan. 6, 1934
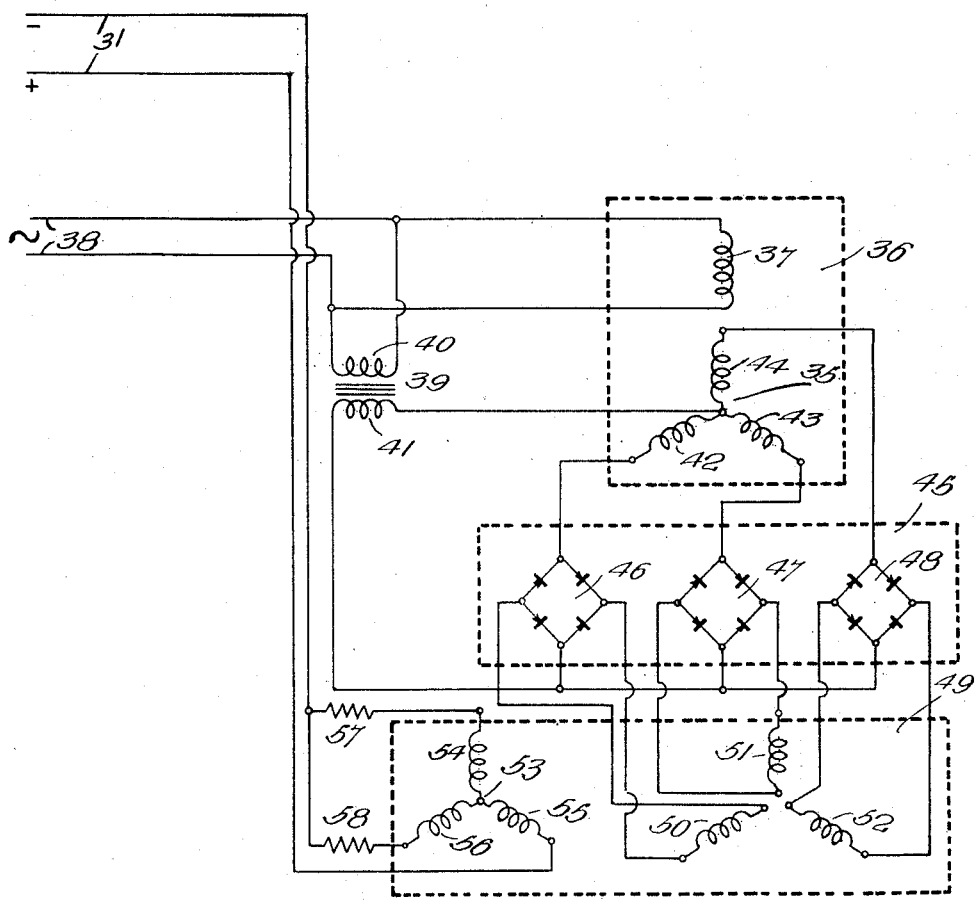
INVENTOR.
Alger S. Riggs,
BY
John B. Brady
ATTORNEY.

Patented July 21, 1936

2,048,082

UNITED STATES PATENT OFFICE 2,048,082

ELECTRICAL CONTROL SYSTEM

Alger S. Riggs, Brooklyn, N. Y.

Application January 6, 1934, Serial No. 705,633

6 Claims. (Cl. 172—239)

My invention relates broadly to electrical control systems and more particularly to an electrical system for transmitting and controlling the angular movement of a device adjustable in one or more azimuths.

One of the objects of my invention is to provide a circuit arrangement for an electrical control system for transmitting angular motion with a high degree of precision and without interference from coercion effects.

Another object of my invention is to provide a circuit arrangement for a synchronous control system for accurately transmitting angular motion without the detrimental influence of coercion effects and without the use of electron tubes in the control system.

Still another object of my invention is to provide a construction of electrical control system and apparatus of considerable stability avoiding the use of fragile electrical instrumentalities thereby insuring the continued operation of the apparatus under conditions of substantial shock such as may occur in service during gunfire.

A further object of my invention is to provide a construction of precision control circuit and apparatus for transmitting angular motion in which means are provided for compensating the control system for any conditions which tend to occur under conditions of departure of the controlled apparatus from the operation of the controlling apparatus for insuring a high degree of accuracy in the synchronous operation of the controlled apparatus with respect to the controlling means.

A still further object of my invention is to provide an improved construction of synchronous control system in which amplification of the control energy is obtained to that degree necessary for controlling synchronous receiving apparatus with a high degree of precision and without detrimental influence from coercion effects.

Another object of my invention is to provide a synchronous electrical control system including a controlling apparatus and one or more synchronous receiving devices with means in circuit therewith for neutralizing coercion effects for insuring precision control of a multiplicity of synchronous receiving devices from a master control device.

Still another object of my invention is to provide a circuit arrangement for an electrical control system which includes one or more stages of rectification and amplification of a type not employing electron tubes which is rugged and reliable in its assembly and operation thereby rendering the control system of my invention particularly adaptable for fire control systems aboard ship.

Other and further objects of my invention reside in an electrical control system including coercion prevention means as set forth more fully in the specification hereinafter following by reference to the accompanying drawing which diagrammatically illustrates one circuit arrangement of the electrical control system of my invention.

My invention is directed to that class of electrical control systems which fall within the following representative applications:

1. Torque amplifiers.
2. Follow-up systems
    (a) Searchlights,
    (b) Rangefinders,
    (c) Gun pointing and fire control,
    (d) Compasses.
3. Motor speed control
    (a) Moving picture camera and projection drive,
    (b) Industrial speed control.

The control system of my invention employs a novel method of power amplification in the attainment of self-synchronous distant electrical control. No vacuum or gas tubes are used in the system. The entire amplification is effected through rotary induction apparatus and by means of the control of the character of the transmitted energy. The apparatus is rugged and reliable in design. There are no delicate adjustments required. I avoid moving contacts, brushes and sliding connections in the entire amplifier system for thereby, to a large extent, reducing maintenance requirements. Every electrical connection throughout the control system is soldered or otherwise permanently secured rendering the system substantially foolproof.

The circuit arrangement of my invention is such that any unforeseen obstructions which might bring about a condition at one or more receivers in a fire control system embodying my invention does not destroy the effective control of all of the other receivers connected to the master controller over the same line. Heretofore in Selsyn systems an obstructed condition existing at any one of the receiving stations renders the entire system inaccurate in its operation by reason of the coercion effects produced by the obstructed receivers with respect to the other receivers of the system and with respect to the master controller. In the circuit arrangement of my invention I neutralize all coercion effects and obstructed conditions at any one of the several receiving stations in the control system produces no detrimental effect with respect to the associated receiving stations on the control line or with respect to the master controller. Referring to the drawing I have shown at 36 an angle multiplying compensated transmitter constituted by a stator winding 37 and a polyphase rotor winding 35. By the angle multiplying compensated transmitter, I refer to apparatus capable of correcting for phase displacement of the control currents and controlling the vector relation of the control currents. The stator winding 37 of the angle multiplying compensated transmitter 36 is energized from an alternating current source connected to leads 38. An audio frequency transformer 39 has its primary winding 40 connected to the power supply source connected with leads 38 and its secondary winding 41 connected in circuit with each of the windings of the rotor 35 of the angle multiplying compensated transmitter 36. The rotor 35 includes windings 42, 43, and 44 connected in Y and disposed in 120° relation. A neutralization stage is connected with the output of the angle multiplying compensated transmitter 36 and includes the rectifier designated generally at 45. The rectifier 45 contains balanced rectifier units shown at 46, 47 and 48. The input terminals of the respective balanced rectifier units 46, 47 and 48 are connected with the windings 42, 43, and 44 of the angle multiplying compensated transmitter 36. The output terminals of the respective balanced rectifier units 46, 47 and 48 connect with the stator windings of the high angle repeater designated generally at 49. By the high angle repeater, I refer to apparatus capable of transmitting control currents of the properly compensated phase determined by the angle multiplying transmitter. The stator windings of the high angle repeater 49 are shown at 50, 51 and 52 disposed at 120° relation and individually connected with the output terminals of the balanced rectifier units shown at 46, 47 and 48. The rotor of the high angle repeater 49 is illustrated generally at 53 as including Y connected windings 54, 55 and 56. The rotor circuit is compensated by means of balancing resistors 57 and 58 which equalize resistance values of the circuit paths to the windings 54, 55 and 56 and through which energy is supplied from the direct current source connected to leads 31. The controlled apparatus such as a search-light motor may be fully reversible and can be started, stopped or reversed readily in response to transmitted signals. Considering the portion of the circuit commencing with inductive device 36 operating as a transmitter, impulses will be transferred to the device 49 which will function as a repeater. The transmitter consists of the inductive device 36 having a single two pole stator winding 37, and a rotor having a two pole three phase windings 42, 43, 44, similar to the conventional "Selsyn" generator. The center tap or neutral point 35 leading to winding 41 is brought out from the rotor through a conventional slip ring as are also the three terminal leads from the windings 42, 43, 44. The repeater 49 consists of a generally similar device having a stator and rotor, both of which are two pole three phase, the stator windings 50, 51, 52 are isolated, i. e., two leads are provided from each winding. The rotor windings 54, 55, 56 are connected together at the neutral point 53, and the three winding leads are brought out through slip rings as in conventional "Selsyn" practice.

It will be understood by one skilled in the art, that the transmitter rotor will show no torque when the current in each winding is in phase and that the power and current taken by the winding 37 will be independent of the relative position of the rotor and stator. In the present invention, I provide a uniform load in each winding of the rotor (secondary) of the transmitter by passing the currents through rectifiers, the direct current output of which operates the receiving or repeating device or devices.

The transformer 39 has its primary connected in parallel with the transmitter stator winding 37 and to a source of alternating current at point 38. Now, as the transmitter rotor is rotated with respect to its stator winding, there will be two points (opposite) where the maximum voltage will be induced in each rotor winding—hence giving rise at the rectifier output to two cycles of current rise per revolution. By introducing the secondary voltage of the winding 41 of transformer 39 into each respective circuit of the rotor windings 42, 43, 44, I cause the device to produce at the output of the rectifiers 46, 47, 48, a three phase output having but one cycle per revolution of the transmitter rotor. The direct current outputs of the rectifiers 46, 47, 48 are conveyed respectively to the repeater stator windings 50, 51, 52, and hence, the direct current field of the repeater has an angular position depending on the relative angular position of the transmitter rotor and stator.

In order that the repeater indicate the angular position of the transmitter, its rotor is "polarized" by connecting its windings to simulate a single phase two pole winding, and is energized from a source of direct current, as shown.

The purpose of using a three phase two pole winding on the repeater rotor instead of a single phase winding is to provide uniform impedance to the stator windings 50, 51, 52, regardless of the relative position of the rotor and stator of the repeater.

In actual practice, the only torque required to operate the transmitter, is that required to overcome its friction, while the repeater follows the angular position of the transmitter with great accuracy, and develops a torque proportional to the value of its internal flux, hence a very small torque applied at the transmitter may be amplified many thousand of times at the repeater. If the repeater rotor and stator be displaced from its position of agreement with that of the transmitter, no effect is reflected to the transmitter.

The system of my invention interposes between the transmitting station and any one of receiving stations, one or more rectification systems in association with rotary transformer apparatus. The alternating current generated at the master control station is rectified and supplied as direct current impulses to the control windings of the rotary transformer apparatus. One or more stages of rectifier and rotary transformer equipment may be employed for increasing the potential at the remote receivers to the required value. In all of such circuit arrangements however, the current impulses are rectified and transmitted to the receiving apparatus. The transmission circuit is unidirectional to the extent that control impulses may be transmitted from the control station to the receiving station but energy cannot be transmitted back from the receiving station to the control station. By virtue of the uni-directional properties of the control system, coercion effects are avoided. In order to obtain the required potentials at the receiving stations the desired ratio of transformation is obtained by increasing the number of stages of rotary transformer devices and selecting the ratio of such transformation to meet requirements of any particular installation.

The elimination of replacement parts by reason of sudden destruction of elements of the system such as the burning out of the electron emitter or heater in an electron tube, gives the system of my invention a real advantage over systems of the prior art requiring electron tube amplification popularly known as thyratron control.

While I have described the system of my invention in certain of its preferred embodiments, I desire that it be understood that modifications may be made and that no limitations upon my invention are intended other than are imposed by the scope of the appended claims.

What I claim as new and desire to secure by Letters Patent of the United States is as follows:

1. A coercionless transmission system for transmitting angular motion comprising an angular motion transmitter, including a stator and a polyphase rotor, connections extending from each phase of the polyphase rotor, a balanced rectifier located in each of said connections, an angular motion repeater having polyphase stator windings and polyphase rotor windings, an individual connection between the respective stator windings and the respective balanced rectifiers, an alternating current source included between each of said rectifiers and the neutral point of the rotor of said angular motion transmitter, and a source of direct current connected with said last mentioned rotor windings.

2. A coercionless transmission system for transmitting angular motion comprising an angular motion transmitter including a stator and a polyphase rotor, connections extending from each phase of said polyphase rotor, bridge circuits having input and output terminals, the aforesaid connections terminating individually with one input terminal of each of said bridge circuits, the other input terminals of said bridge circuits being connected in common and through an alternating current source with the neutral terminal of said polyphase rotor, rectifying means at each of said bridge circuits, an angular motion repeater having polyphase stator windings and polyphase rotor windings, individual connections between the output terminals of said respective bridge circuits and the respective stator windings of said angular motion repeater, and a source of direct current connected with said last mentioned rotor windings.

3. A coercionless transmission system for transmitting angular motion comprising an angular motion transmitter including a stator and a polyphase rotor, connections extending from each phase of said polyphase rotor, bridge circuits having input and output terminals, the aforesaid connections terminating individually with one input terminal of each of said bridge circuits, the other input terminals of said bridge circuits being connected in common and through an alternating current source with the neutral terminal of said polyphase rotor, rectifying means at each of said bridge circuits, an angular motion repeater having polyphase stator windings and polyphase rotor windings, individual connections between the output terminals of said respective bridge circuits and the respective stator windings of said angular motion repeater, a source of direct current connected with said last mentioned rotor windings, and means for equalizing the current through the respective rotor windings of said angular motion repeater.

4. A coercionless transmission system for transmitting angular motion comprising an angular motion transmitter including a stator and a polyphase rotor, connections extending from each phase of said polyphase rotor, bridge circuits having input and output terminals, the aforesaid connections terminating individually with one input terminal of each of said bridge circuits the other input terminals of said bridge circuits being connected in common and through an alternating current source with the neutral terminal of said polyphase rotor, rectifying means at each of said bridge circuits, an angular motion repeater having polyphase stator windings and polyphase rotor windings, individual connections between the output terminals of said respective bridge circuits and the respective stator windings of said angular motion repeater, a source of direct current connected with said last mentioned rotor windings, and resistors disposed in circuit between said source of direct current and certain of said last mentioned rotor windings for equalizing the current distribution in the rotor circuit of said angular motion repeater.

5. A coercionless transmission system for transmitting angular motion comprising an angular motion transmitter including a stator and a polyphase rotor, connections extending from each phase of said polyphase rotor, bridge circuits having input and output terminals, the aforesaid connections terminating individually with one input terminal of each of said bridge circuits, the other input terminals of said bridge circuits being connected in common and through an alternating current source with the neutral terminal of said polyphase rotor, a rectifier individual to each arm of each of said bridge circuits, an angular motion repeater having polyphase stator windings and polyphase rotor windings, individual connections between the output terminals of said respective bridge circuits and the respective stator windings of said angular motion repeater, and a source of direct current connected with said last mentioned rotor windings.

6. A coercionless transmission system for transmitting angular motion comprising an angular motion transmitter including a stator and a polyphase rotor, connections extending from each phase of said polyphase rotor, a source of alternating current and rectifying means connected with each of said connections, an angular motion repeater having polyphase stator windings each conductively isolated one from another and having polyphase rotor windings, separate connections from each of the conductively isolated stator windings to the respective rectifying means in each of the aforesaid connections, and a source of direct current in circuit with the rotor windings of said angular motion repeater.

ALGER S. RIGGS.